(12) United States Patent
Lin et al.

(10) Patent No.: US 8,304,117 B2
(45) Date of Patent: Nov. 6, 2012

(54) GEL POLYMER ELECTROLYTE PRECURSOR AND RECHARGEABLE CELL COMPRISING THE SAME

(75) Inventors: Yueh-Wei Lin, Hsinchu (TW); Tsung-Hsiung Wang, Taichung County (TW); Jing-Pin Pan, Hsinchu Hsien (TW); Chang-Rung Yang, Taichung (TW); Jung-Mu Hsu, Penghu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1311 days.

(21) Appl. No.: 12/003,599

(22) Filed: Dec. 28, 2007

(65) Prior Publication Data
US 2008/0160404 A1    Jul. 3, 2008

(30) Foreign Application Priority Data
Dec. 29, 2006    (TW) ................................ 95149880 A

(51) Int. Cl.
*H01M 6/04*    (2006.01)
(52) U.S. Cl. ........ 429/328; 429/189; 429/330; 429/332; 429/334; 429/335; 429/336; 429/200; 429/307; 429/300; 429/303; 252/62.2
(58) Field of Classification Search .................. 429/328, 429/189, 330, 332, 334, 335, 336, 200, 307, 429/300, 303; 252/62.2
See application file for complete search history.

(56) References Cited

U.S. PATENT DOCUMENTS

| 6,723,473 | B1 |   | 4/2004 | Oura et al. |   |
|---|---|---|---|---|---|
| 6,811,929 | B2 | * | 11/2004 | Noh et al. | 429/303 |
| 6,939,644 | B2 |   | 9/2005 | Aoshima et al. |   |
| 2004/0241551 | A1 | * | 12/2004 | Nakamura et al. | 429/303 |

FOREIGN PATENT DOCUMENTS

| JP | 2002-305031 | A |   | 10/2002 |
|---|---|---|---|---|
| KR | 10-2002-0033633 | A |   | 5/2002 |
| KR | 2002-0057571 | A |   | 7/2002 |
| TW | 200607312 | A |   | 2/2006 |
| TW | 251361 |   | * | 3/2006 |
| WO | WO 03/281444 |   | * | 4/2003 |

OTHER PUBLICATIONS

Taiwan Office Action, Appl. No. 096145899, Apr. 13, 2011, pp. 1-7.

* cited by examiner

*Primary Examiner* — Laura Weiner
(74) *Attorney, Agent, or Firm* — Birch, Stewart, Kolasch & Birch, LLP

(57) ABSTRACT

A gel polymer electrolyte precursor and a rechargeable cell comprising the same are provided. The gel polymer electrolyte precursor comprises a bismaleimide monomer or bismaleimide oligomer, a compound having formula (I):

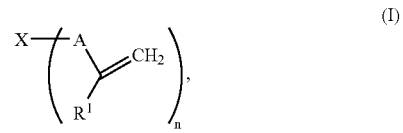

a non-aqueous metal salt electrolyte, a non-protonic solvent, and a free radical initiator, wherein the bismaleimide oligomer is prepared by reaction of barbituric acid and bismaleimide, X comprises oxygen, organic hydrocarbon compounds, organic hydrocarbon oxide compounds, oligomers or polymers, n is 2 or 3, and A independently comprises

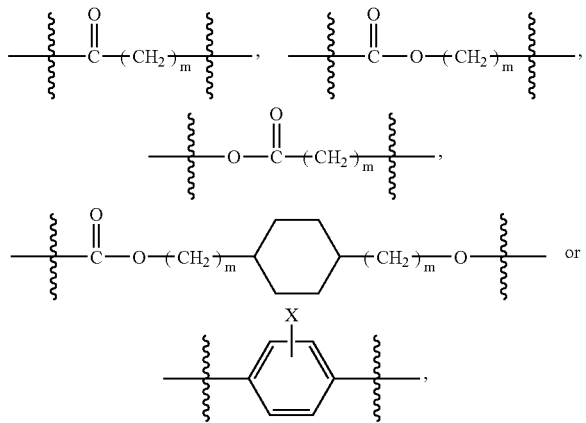

wherein m is 0~6, X comprises hydrogen, cyano, nitro or halogen, and $R^1$ independently comprises hydrogen or C1~4 alkyl.

25 Claims, No Drawings

GEL POLYMER ELECTROLYTE PRECURSOR AND RECHARGEABLE CELL COMPRISING THE SAME

BACKGROUND OF THE INVENTION

1. Field of the Invention

The invention relates to an electrolyte and its precursor, and more specifically to a gel polymer electrolyte and its precursor.

2. Description of the Related Art

Among portable electronic products, a lithium rechargeable cell is popular due to its light weight, high voltage and high energy density. With development of electronic products continually moving towards thinner profiles and increased flexibility, use of polymer electrolyte in lithium rechargeable cells have become more popular.

Lithium rechargeable cells utilizing polymer electrolyte can be effectively applied in commercial electronic products because the cells have no electrolyte leakage, a thin profile, a multi-angle, a light weight, low vapor pressure and low self-discharge.

To achieve flexible and thin cells, some gel-type polymer materials combined with electrolyte compositions have been developed, for example, polyethylene oxide (PEO), polymethyl methacrylate (PMMA), polyvinylidene difluoride (PVDF), polyaniline (PAN) and derivatives or copolymers thereof. The conventional fabrication of the gel-type polymer electrolyte utilized in a polymer cell is described as follows. After filming and removal of solvent, the polymer film is interposed between active substance layers or coated thereon to form a cell core. A liquid electrolyte is then filled to adhere to the electrode plates. When charge/discharge, lithium ions are inserted and removed, reducing expansion and contraction of the laminated electrode plates, thus, prolonging cell lifetime. However, the described conventional fabrication method is complex.

BRIEF SUMMARY OF THE INVENTION

One embodiment of the invention provides a gel polymer electrolyte precursor comprising:

a bismaleimide monomer or bismaleimide oligomer, wherein the bismaleimide oligomer is prepared by reaction of barbituric acid and bismaleimide;

a compound having formula (I):

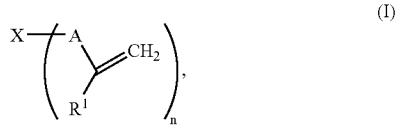

wherein X comprises oxygen, organic hydrocarbon compounds, organic hydrocarbon oxide compounds, oligomers or polymers; n is 2 or 3; A independently comprises

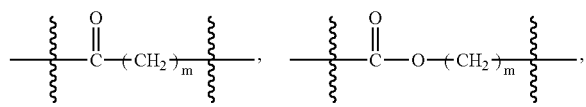

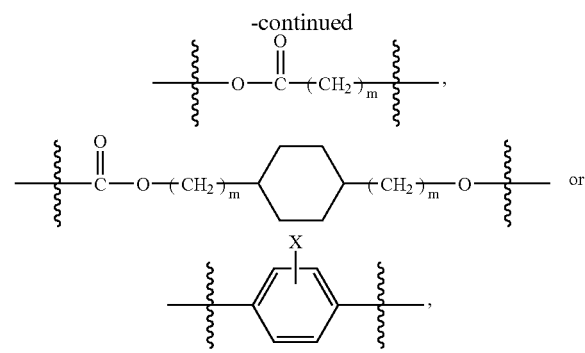

wherein m is 0~6 and X comprises hydrogen, cyano, nitro or halogen; and $R^1$ independently comprises hydrogen or C1~4 alkyl;

a non-aqueous metal salt electrolyte;
a non-protonic solvent; and
a free radical initiator.

One embodiment of the invention provides an alkali metal rechargeable cell comprising a negative electrode capable of electrochemical insertion and removal from alkali metal, a positive electrode comprising an electrode active substance capable of electrochemical insertion and removal from alkali metal, and a gel polymer electrolyte prepared by heating polymerization/cross-linking of the disclosed gel polymer electrolyte precursor.

The gel polymer electrolyte precursor in an embodiment of the invention is rapidly formed into a soft gel, improving performance of an alkali metal rechargeable cell, by for example, high interface compatibility and high lithium ion conduction between positive and negative electrodes. Leakage of the lithium rechargeable cell utilizing the gel polymer electrolyte is avoided. The gel polymer electrolyte is rapidly cross-linked, leaving electrolyte exceeding 95%, with a high ionic conductivity.

A detailed description is given in the following embodiments

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention provides an alkali metal rechargeable cell comprising a positive electrode, a negative electrode and a gel polymer electrolyte.

Gel Polymer Electrolyte

The gel polymer electrolyte is prepared by heating polymerization/cross-linking of a gel polymer electrolyte precursor. The gel polymer electrolyte precursor is injected into an aluminum foil cell. After cell packaging, the gel polymer electrolyte precursor is heated by heating polymerization to form the gel polymer electrolyte, for example, cross-linked copolymers. The temperature of the heating polymerization ranges from 30~130° C. The gel polymer electrolyte can be tightly combined with electrode plates, with high fabrication compatibility.

The gel polymer electrolyte precursor comprises (a)~(e).

(a) A bismaleimide monomer or bismaleimide oligomer. The bismaleimide oligomer is prepared by reaction of barbituric acid and bismaleimide.

(b) A compound having formula (I):

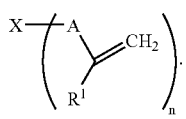
(I)

In formula (I), X may comprise oxygen, organic hydrocarbon compounds, organic hydrocarbon oxide compounds, oligomers or polymers. n is 2 or 3. A may independently comprise

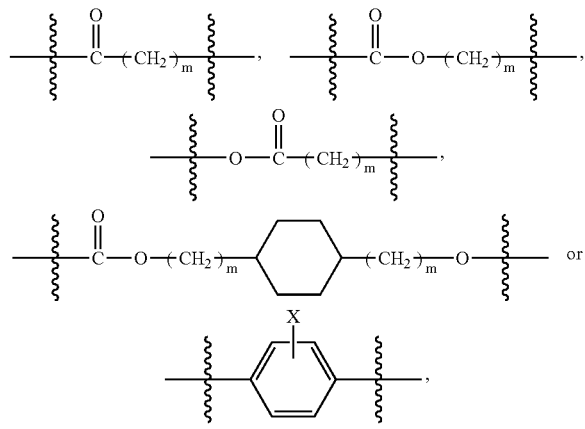

wherein m is 0~6 and X may comprise hydrogen, cyano, nitro or halogen. $R^1$ may independently comprise hydrogen or C1~4 alkyl. Specifically, the gel polymer electrolyte precursor may comprise (a) and (b), or (a) or (b).

(c) A non-aqueous metal salt electrolyte.
(d) A non-protonic solvent.
(e) A free radical initiator.

The bismaleimide monomer or bismaleimide oligomer has a weight ratio of 1~50%. The compound having formula (I) has a weight ratio of 1~50%. The non-aqueous metal salt electrolyte has concentration of 0.5M~2M in the non-protonic solvent. The non-protonic solvent has a weight ratio of 2~90%. The free radical initiator has a weight ratio of 0.1~10% of the sum of the bismaleimide monomer or bismaleimide oligomer and the compound having formula (I).

The bismaleimide monomer has formulae (II) and (III):

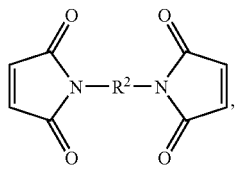
(II)

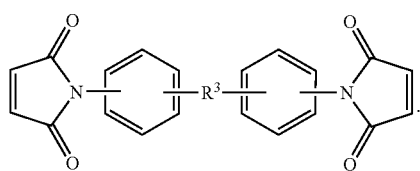
(III)

In the formulae, $R^2$ may comprise —$RCH_2$-(alkyl), —$RNH_2R$—, —$C(O)CH_2$—, —$CH_2OCH_2$—, —$C(O)$—, —O—, —O—O—, —S—, —S—S—, —S(O)—, —$CH_2S$(O)$CH_2$—, —(O)S(O)—, —$C_6H_5$—, —$CH_2(C_6H_5)CH_2$—, —$CH_2(C_6H_5)(O)$—, phenylene, diphenylene, substituted phenylene or substituted diphenylene, $R^3$ comprises RCH, —C(O)—, —C(CH$_3$)$_2$—, —O—, —O—O—, —S—, —S—S—, —(O)S(O)— or —S(O)—. R may independently comprise hydrogen or C1~4 alkyl. The bismaleimide monomer may be selected from the group consisting of N,N'-bismaleimide-4,4'-diphenylmethane, [1,1'-(methylenedi-4,1-phenylene)bismaleimide], [N,N'-(1,1'-biphenyl-4,4'-diyl)bismaleimide], [N,N'-(4-methyl-1,3-phenylene)bismaleimide], [1,1'-(3,3'dimethyl-1,1'-biphenyl-4,4'-diyl)bismaleimide], N,N'-ethylenedimaleimide, [N,N'-(1,2-phenylene)dimaleimide], [N,N'-(1,3-phenylene)dimaleimide], N,N'-thiodimaleimide, N,N'-dithiodimaleimide, N,N'-ketonedimaleimide, N,N'-methylene-bis-maleinimide, bis-maleinimidomethyl-ether, [1,2-bis-(maleimido)-1,2-ethandiol], N,N'-4,4'-diphenylether-bis-maleimid and [4,4'-bis(maleimido)-diphenylsulfone].

The preparation of the bismaleimide oligomer is shown as follows. A bismaleimide monomer is dissolved in a solvent. Next, a multi-batch of barbituric acid is added to the solvent containing the bismaleimide monomer. For each batch, the molar ratio of the barbituric acid to the bismaleimide monomer is less than 0.2. In an embodiment, the barbituric acid or its derivative is added to the reactable solvent system containing the bismaleimide monomer or its derivative by using two or more batches to perform heating polymerization; in efforts to avoid overreaction and formation of gelation or network polymerization should only one batch be performed.

The conditions for the preparation of the bismaleimide oligomer are described as follows. The molar ratio of the total barbituric acid and the bismaleimide monomer is about 1:3~2:1 or 1:2~1:1. The barbituric acid or its derivative is added to the reactable solvent system containing the bismaleimide monomer or its derivative using the multi-batch to perform the heating polymerization. The amount of addition may be the same or different. The batch number may be 2~30 or 4~16. The addition time may be 5 min~6 hr or 15 min~2 hr in each batch. The temperature of the heating polymerization may be 100~150° C. or 120~140° C. The reaction time means the continuous reaction time after addition of the barbituric acid or its derivative, may be 0.5~12 hr or 1~6 hr.

The barbituric acid has formula (IV):

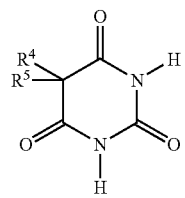
(IV)

In formula (IV), $R^4$ and $R^5$ may be the same or different and comprise H, $CH_3$, $C_2H_5$, $C_6H_5$, $CH(CH_3)_2$, $CH_2CH(CH_3)_2$, $CH_2CH_2CH(CH_3)_2$ or

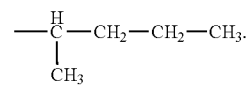

The bismaleimide oligomer is a multi-function bismaleimide oligomer with a hyper branch architecture or multi double-bond reactive functional groups. In the hyper branch architecture, the bismaleimide serves as an architecture matrix. The radical barbituric acid is grafted to the bismaleimide's double bond to begin branching and ordering to form the hyper branch architecture. The high-purity multi-function bismaleimide oligomer is prepared by adjustment of, for example, the concentration ratio, the chemical order addition procedure, the reaction temperature, the reaction time, the environmental condition, the branching degree, the polymerization degree, the structural configuration and the molecular weight. The branch architecture is [(bismaleimide monomer)-(barbituric acid)$_x$]$_m$, wherein x is 0~4 and m (repeating unit) is less than 20. In an embodiment, x may be 0.5~2.5 and m (repeating unit) may be 2~10. Additionally, each branch may further be branched. Thus, the total branch architecture is {[(bismaleimide monomer)-(barbituric acid)$_x$]$_m$}$_n$, wherein x is 0~4 or 0.5~2.5, m (repeating unit) is less than 20 or 2~20, and n (repeating unit) is less than 50 or 5~20.

The electron-deficient unsaturated double bonds at the two ends of the bismaleimide monomer are active to be polymerized due to the adjacent electron-withdrawing carbonyl groups. When a sufficient energy (heating or irradiation) is provided, the alkyl of the barbituric acid or its derivative dissolved in a solvent is uniformly broken down to form an alkyl radical having an unpaired electron, serving as a free radical initiator to attack the double bonds. A high-polarity solvent, for example, γ-butyrolactone, propylene carbonate or N-methylpyrrolidone, may facilitate the polymerization of the bismaleimide and the barbituric acid. Of which, the solid content thereof, would be altered.

The compound having formula (I) is provided.

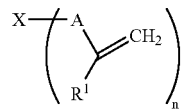 (I)

In formula (I), X may comprise oxygen, organic hydrocarbon compounds, organic hydrocarbon oxide compounds, oligomers or polymers. n is 2 or 3. A may independently comprise

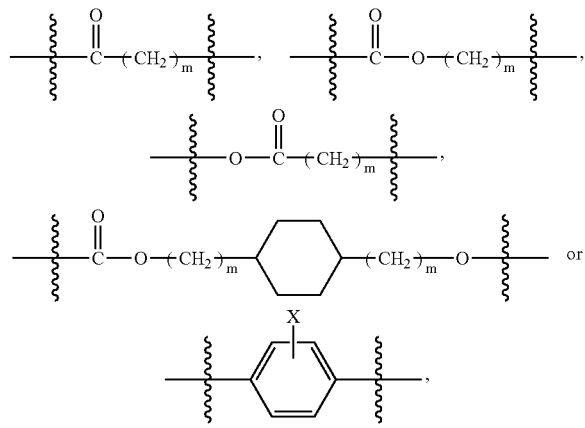

wherein m is 0~6 and X may comprise hydrogen, cyano, nitro or halogen. $R^1$ may independently comprise hydrogen or C1~4 alkyl.

In an embodiment, X is the organic hydrocarbon compounds and may comprise C1~20 alkyl, C4~20 cycloalkyl, C2~20 unsaturated hydrocarbon, C6~20 aromatic hydrocarbon or combinations thereof, wherein

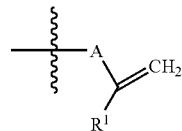

is substituted for hydrogen of X. In an embodiment, X is the organic hydrocarbon oxide compounds and may comprise C1~20 monoalcohol, C1~20 polyalcohol, C1~20 aldehyde, C2~20 ether, C2~20 ketone, C2~20 ester, C2~20 heterocyclic aromatic hydrocarbon or combinations thereof, wherein

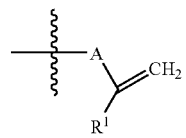

is substituted for hydrogen of X. In an embodiment, X is the oligomers (molecular weight less than 300) and may comprise ethylene glycol oligomer or propylene glycol oligomer, wherein

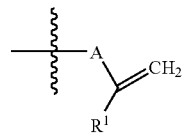

is substituted for hydrogen of X. In an embodiment, X is the oligomers (molecular weight ranging from 200~2,000) and may comprise polyethylene glycol or polypropylene glycol, wherein

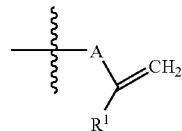

is substituted for hydrogen of X. In an embodiment, X may comprise —C$_i$H$_{2i}$—O—C$_i$H$_{2i}$—, —O—C$_j$H$_{2j}$—O—, phenyl, alkyl, —C$_j$H$_{2j}$—S(=O)—C$_j$H$_{2j}$— or —C$_j$H$_{2j}$—(O=)S(=O)—C$_j$H$_{2j}$—, with a molecular weight less than 300. i is 0~6, j is 1~6, and

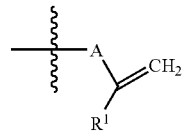

is substituted for hydrogen of X. In an embodiment, X may have formula of

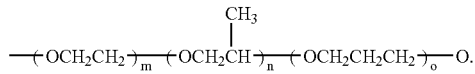

m and n are integers exceeding 1.

The compounds having formula (I) in an embodiment of the invention are shown in Table 1.

TABLE 1

| No. | Structures | X | A | R¹ |
|---|---|---|---|---|
| 1 | ![struct1] | O | C=O | H |
| 2 | ![struct2] | OC$_2$H$_4$ | C=O | CH$_3$ |
| 3 | ![struct3] | C$_4$H$_8$ | ![A3] | CH$_3$ |
| 4 | ![struct4] | ![X4] | C=O | C$_2$H$_5$ |
| 5 | ![struct5] | ![benzene] | ![A5] | C$_2$H$_5$ |
| 6 | ![struct6] | ![benzene] | ![A6] | C$_3$H$_7$ |
| 7 | ![struct7] | ![X7] | C=O | CH$_3$ |

TABLE 1-continued

| No. | Structures | X | A | R¹ |
|---|---|---|---|---|
| 8 | | $\text{O}\!\!-\!\!\overset{|}{\underset{|}{\text{C}}}\!\!-\!\!\text{O}\!\!\left(\phantom{x}\right)_{\!3}\!\!\text{O}$ | C=O | CH₃ |
| 9 | 50 < n < 80 | $\text{O}\!\!-\!\!\left(\phantom{x}\right)_{\!n}\!\!\text{O}$  50 < n < 80 | O C=O | CH₃ |
| 10 | | | C₃H₆ —O—C(=O)—CH₂— | CH₃ |
| 11 | | | C₃H₆ —O—CH₂—⌬—CH₂—O | C₄H₉ |

The compound having formula (I) may comprise polyethylene glycol dimethacrylate, bis[[4-[(vinyloxy)methyl]cyclohexyl]methyl]terephthalate, triallyl trimellitate, tetra(ethylene glycol)diacrylate, triethylene glycol dimethacrylate, bis[4-(vinyloxy)butyl]succinate or bis[4-(vinyloxy)butyl] isophthalate.

The gel polymer electrolyte precursor may further comprise a thickening agent such as poly(vinylidenefluoride) (PVdF), poly(vinylidene fluoride-co-hexafluoropylene) (PVdF-HFP), poly(vinylidene carbonates) (PVdC), poly acrylonitrile (PAN), poly(vinyl chloride) (PVCA), poly(vinyl sulfone) (PVS), poly(p-phenylene terethalamide) (PPTA), poly(vinyl pyrrolidone) (PVP), polyethylene glycol diacrylate, polyethylene glycol diacrylate or poly vinylene carbonate.

The non-aqueous metal salt electrolyte may be selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$ and $LiCF_3SO_3$.

The non-protonic solvent may comprise ethylene carbonate (EC), propylene carbonate (PC), diethyl carbonate (DEC), ethyl acetate (EA) or propyl acetate (PA). Additionally, the non-protonic solvent may comprise a first solvent with higher dielectric constant and higher viscosity and a second solvent with lower dielectric constant and lower viscosity. The first solvent may comprise ethylene carbonate (EC), propylene carbonate (PC), butylene carbonate, dipropyl carbonate, acid anhydride, N-methylpyrrolidone, N-methyl acetamide, N-methyl formamide, dimethyl formamide, γ-butyrolactone, acetonitrile, dimethyl sulfoxide, dimethyl sulfite, VC or mixture thereof. The second solvent may comprise 1,2-diethoxyethane, 1,2-dimethoxyethane, 1,2-dibutoxyethane, tetrahydrofuran, 2-methyl tetrahydrofuran, propylene oxide, methyl acetate, ethyl acetate, methyl butyrate, ethyl butyrate, methyl propionate, ethyl propionate, dimethyl carbonate (DMC), diethyl carbonate (DEC), ethyl methyl carbonate (EMC), propyl acetate (PA) or mixtures thereof. The second solvent is optional.

In an embodiment, the non-protonic solvent comprises ethylene carbonate (EC), propylene carbonate (PC) and diethyl carbonate (DEC). The ethylene carbonate (EC) has a volume ratio of 10~50%. The propylene carbonate (PC) has a volume ratio of 5~80%. The diethyl carbonate (DEC) has a volume ratio of 3~75%.

The free radical initiator may be selected from the group consisting of ketone peroxide, peroxy ketal, hydroperoxide, dialkyl peroxide, diacyl peroxide, peroxy ester and azo compound, for example, 2,2-azo-bis-isobutyronitrile (AIBN), phenyl-azo-triphenylmethane, t-butyl peroxide (TBP), cumyl peroxide, acetyl peroxide, benzoyl peroxide (BPO), lauroyl peroxide, t-butyl hydroperoxide, [Bis(4-tert-butylcyclohexyl) peroxydicarbonate] (BCHPC) or t-butyl perbenzoate.

In an embodiment, the gel polymer electrolyte precursor may further comprise a passive-film type additive, for example, vinylene carbonate, sulfites, sulfates, phosphonate or derivatives thereof.

Preparation of Positive and Negative Electrode Plates

The alkali metal rechargeable cell comprises a positive and a negative electrode plates. The preparation of the positive electrode plate is shown as follows. A positive electrode raw material comprising 80~95% positive electrode active substance, 3~15% conductive additive and 3~10% fluorine-containing resin adhesive dissolved in n-methyl pyrrolidone (NMP) is uniformly coated on an aluminum foil roll (300 m×35 cm×20 μm). After drying, the positive electrode roll is pressed, stripped and vacuum-dried at 110° C. for 4 hr. The positive electrode active substance may be lithium oxide, lithium sulfide, lithium selenide, or lithium telluride of vanadium, titanium, chromium, copper, molybdenum, niobium, iron, nickel, cobalt and manganese. The fluorine-containing resin adhesive may comprise polyvinylidene difluoride (PVDF). The conductive additive may comprise carbon black, graphite, acetylene black, nickel powder, aluminum powder, titanium powder or stainless steel powder.

The preparation of the negative electrode plate is shown as follows. A negative electrode raw material comprising 90% negative electrode active substance and 3~10% fluorine-containing resin adhesive dissolved in n-methylpyrrolidone (NMP) is uniformly coated on an aluminum foil roll (300 m×35 cm×10 μm). After drying, the negative electrode roll is pressed, stripped and vacuum-dried at 110° C. for 4 hr. The negative electrode active substance may be mesocarbon microbeads (MCMB), vapor grown carbon fiber (VGCF), carbon nano tube (CNT), coke, carbon black, graphite, acetylene black, carbon fiber, glassy carbon or fluorine-containing resin adhesive such as polyvinylidene difluoride (PVDF).

EXAMPLES

Example 1

Synthesis of Modified Bismaleimide Oligomer 19.9995 g 1,1-methylenedi-4,1-phenylene bismaleimide monomer particles or powders and 108.6008 g γ-butyrolactone were mixed in a 250 mL round-bottomed three-necked flask and heated to 130° C. with stirring until the bismaleimide monomer was completely dissolved. Next, 7.1483 g barbituric acid powders was progressively added to the 130° C. bismaleimide/γ-butyrolactone solution with 16 batches (15-min interval) and stirred to perform bismaleimide polymerization. After addition of the barbituric acid batches were completed, the polymerization continuously proceeded for 6 hr to form bismaleimide oligomer. The mole concentration ratio of the bismaleimide and barbituric acid was 1:1.

Example 2

Preparation of Gel Polymer Electrolyte Precursor

The gel polymer electrolyte precursors were prepared with various composition ratios shown in Table 2. Additionally, a soft-gel electrolyte was formed following heating at 90° C. for 1 hr.

TABLE 2

| No. | Composition ratios | Gelatinization conditions | Gelatinization type |
|---|---|---|---|
| 2-1 | MBMI1-10*:electrolyte*(%) = 3.5:96.5<br>BCHPC*:MBMI1-10 = 1:10 | 90° C., 1 hr | Hard-gel type |
| 2-2 | MBMI1-10*:electrolyte*(%) = 5:95<br>BCHPC:MBMI1-10 = 1:10 | 90° C., 1 hr | Hard-gel type |
| 2-3 | MBMI1-10*:electrolyte*(%) = 10:90<br>BCHPC:MBMI1-10 = 1:10 | 90° C., 1 hr | Hard-gel type |
| 2-4 | (MBMI1-10*+4EGDMA):electrolyte*(%) = 3.5:96.5<br>MBMI1-10*:4EGDMA = 1:2<br>BCHPC:(MBMI1-10+4EGDMA) = 1:10 | 90° C., 1 hr | Hard-gel type |
| 2-5 | (MBMI1-10*+4EGDMA):electrolyte*(%) = 5:95<br>MBMI1-10*:4EGDMA = 1:2<br>BCHPC:(MBMI1-10+4EGDMA) = 1:10 | 90° C., 1 hr | Hard-gel type |
| 2-6 | (MBMI1-10*+4EGDMA):electrolyte*(%) = 10:95<br>MBMI1-10*:4EGDMA = 1:2<br>BCHPC:(MBMI1-10+4EGDMA) = 1:10 | 90° C., 1 hr | Hard-gel type |
| 2-7 | (MBMI1-2*+4EGDMA):electrolyte*(%) = 5:95<br>MBMI1-2*:4EGDMA = 1:2<br>BCHPC:(MBMI1-2+4EGDMA) = 1:10 | 90° C., 1 hr | Soft-gel type |
| 2-8 | (MBMI1-2*+4EGDMA):electrolyte*(%) = 5:95<br>MBMI1-2*:4EGDMA = 1:3<br>BCHPC:(MBMI1-2+4EGDMA) = 1:10 | 90° C., 1 hr | Soft-gel type |
| 2-9 | (MBMI1-2*+9EGDMA):electrolyte*(%) = 5:95<br>MBMI1-2*:9EGDMA = 1:3<br>BCHPC:(MBMI1-2+9EGDMA) = 1:10 | 90° C., 1 hr | Soft-gel type |
| 2-10 | (MBMI1-2*+16EGDMA):electrolyte*(%) = 5:95<br>MBMI1-2*:16EGDMA = 1:3<br>BCHPC:(MBMI1-2+16EGDMA) = 1:10 | 90° C., 1 hr | Soft-gel type |
| 2-11 | (MBMI1-2*+BCP*):electrolyte*(%) = 5:95<br>MBMI1-2*:BCP* = 1:3<br>BCHPC:(MBMI1-2+BCP) = 1:10 | 90° C., 1 hr | Soft-gel type |
| 2-12 | (MBMI1-2*+TAT*):electrolyte*(%) = 5:95<br>MBMI1-2*:TAT* = 1:3<br>BCHPC:(MBMI1-2+TAT) = 1:10 | 90° C., 1 hr | Soft-gel type |

Electrolyte: a composition of 1.1M $LiPF_6$ and EC/DEC/PC = 2:3:5 or EC/DEC/PC = 2:3:2.5
BCHPC: bis-(4-tert-butylcyclohexyl) peroxydicarbonate (initiator)
MBMI1-10: a bismaleimide oligomer prepared by Example 1 (the ratio of 1,1- methylenedi-4,1-phenylene bismaleimide and barbituric acid is 10:1
MBMI1-2: a bismaleimide oligomer prepared by Example 1 (the ratio of 1,1- methylenedi-4,1-phenylene bismaleimide and barbituric acid is 2:1
4EGDMA: tetra(ethylene glycol) methacrylate
9EGDMA: 9(ethylene glycol) methacrylate
16EGDMA: 16(ethylene glycol) methacrylate

Example 3

Impedance and Ionic Conductivity Measurement

The ionic conductivity of the soft-gel polymer electrolyte was measured by the following method. The ionic conductivity ($\sigma$) was obtained by analysis of alternating current (AC) impedance. With an alternating current application, the electrolyte was scanned from high frequency of 50,000 Hz to low frequency of 100 Hz to acquire a relationship between impedances and phase angles and converted into a Nyquist figure presented by real impedance (Z') and source impedance (−Z"). When the source impedance (−Z") of the ion diffusion curve was zero, the intercept of the real impedance (Z') was used for the calculation. The formula is shown as follows.

$$\sigma = L/A \times R$$

$\sigma$=conductivity, L=a distance between two electrodes (cm), R=impedance of electrolyte ($\Omega$), A=electrode area (cm$^2$), design of measuring tank: L=0.5 cm and A=0.25$\pi$ cm$^2$ The results were shown as in Table 3.

TABLE 3

| | | Ionic conductivity (mS/cm) | |
|---|---|---|---|
| No. | Composition ratios | Liquid electrolyte precursor | Gel-type electrolyte |
| 3-1 | (MBMI1-10+9EGDMA):electrolyte*(%) = 5:95 MBMI1-10:9EGDMA = 1:2 BCHPC:(MBMI1-10+9EGDMA) = 1:10 | 6.14 | 6.22 |
| 3-2 | (MBMI1-5+9EGDMA):electrolyte*(%) = 5:95 MBMI1-5:9EGDMA = 1:2 BCHPC:(MBMI1-5+9EGDMA) = 1:10 | 6.11 | 5.07 |
| 3-3 | (MBMI1-2+9EGDMA):electrolyte*(%) = 5:95 MBMI1-2:9EGDMA = 1:2 BCHPC:(MBMI1-2+9EGDMA) = 1:10 | 6.33 | 5.54 |
| 3-4 | (MBMI1-1+9EGDMA):electrolyte*(%) = 5:95 MBMI1-1:9EGDMA = 1:2 BCHPC:(MBMI1-1+9EGDMA) = 1:10 | 6.17 | 5.66 |

Electrolyte: a composition of 1.1M LiPF$_6$ and EC/DEC/PC = 2:3:2.5
BCHPC: bis-(4-tert-butylcyclohexyl) peroxydicarbonate (initiator)
MBMI1-10: a bismaleimide oligomer prepared by Example 1 (the ratio of 1,1-methylenedi-4,1-phenylene bismaleimide and barbituric acid is 10:1
MBMI1-5: a bismaleimide oligomer prepared by Example 1 (the ratio of 1,1-methylenedi-4,1-phenylene bismaleimide and barbituric acid is 5:1
MBMI1-2: a bismaleimide oligomer prepared by Example 1 (the ratio of 1,1-methylenedi-4,1-phenylene bismaleimide and barbituric acid is 2:1
MBMI1-1: a bismaleimide oligomer prepared by Example 1 (the ratio of 1,1-methylenedi-4,1-phenylene bismaleimide and barbituric acid is 1:1
9EGDMA: 9(ethylene glycol) methacrylate The above experimental conditions were at 90° C. and for 1 hr. The results indicate that the ionic conductivity of the gel-type electrolyte is similar to that of the liquid electrolyte precursor, with high ionic conductivity.

Example 4

Flame Retardancy Test

The precursors with the composition ratios shown in Table 4 were dissolved in 1.1M LiPF$_6$ and EC/PC/DEC=3:2:5 and heated at 90° C. for 1 hr to form the gel-type polymer electrolyte. The gel-type electrolyte was then burned for 10 sec to observe its flame retardancy, as shown in Table 4.

TABLE 4

| No. | Composition ratios | Flame retardancy test |
|---|---|---|
| 4-1 | 1.1M LiPF$_6$ EC/PC/DEC = 3:2:5 | Inflammation was stopped. Flame was stopped until carbonization is completed. |
| 4-2 | MBMI1-10:electrolyte*(%) = 2.5:97.5 BCHPC:MBMI1-10 = 1:10 | Inflammation was stopped. Flame was immediately stopped. |
| 4-3 | MBMI1-10:electrolyte*(%) = 5:95 BCHPC:MBMI1-10 = 1:10 | Inflammation was stopped. Flame was immediately stopped. |
| 4-4 | MBMI1-10:electrolyte*(%) = 10:90 BCHPC:MBMI1-10 = 1:10 | Inflammation was stopped. Flame was immediately stopped. |

Electrolyte: a composition of 1.1M LiPF$_6$ and EC/PC/DEC = 3:2:5

The results indicate that when the ratio of the bismaleimide oligomer is equal to or greater than 2.5%, the flame retardancy of the gel-type polymer electrolyte is apparent.

Example 5

Electrical Performance of Gel-Type Polymer Cell

After the aluminum foil cell (50×20×30 mm) was assembled, the polymer precursor was polymerized therein at 90° C. for 1 hr. The charge/discharge rate was 0.2 C. The results were shown as in Table 5.

TABLE 5

| No. | Composition ratios | Charge/discharge numbers | Charge capacitance (mAh) | Discharge Capacitance (mAh) | Charge/discharge efficiency | Irreversibility of charge/discharge (%) |
|---|---|---|---|---|---|---|
| 5-1 | (MBMI1-10 + 9EGDMA):electrolyte* (%) = 5:95 MBMI1-10:9EGDMA = 1:2 BCHPC:(MBMI1-10 + 9EGDMA) = 1:10 | 1<br>2<br>3<br>4 | 264.3<br>271.7<br>264.8<br>264.2 | 222.1<br>260.0<br>258.1<br>259.5 | 84.0<br>95.7<br>97.5<br>98.2 | 16.0<br>4.3<br>2.5<br>1.8 |
| 5-2 | (MBMI1-5 + 9EGDMA):electrolyte* (%) = 5:95 MBMI1-5:9EGDMA = 1:2 BCHPC:(MBMI1-5 + 9EGDMA) = 1:10 | 1<br>2<br>3<br>4 | 262.5<br>269.5<br>262.4<br>260.5 | 226.0<br>260.7<br>258.3<br>257.7 | 86.1<br>96.7<br>98.4<br>99.0 | 13.9<br>3.3<br>1.6<br>1.0 |
| 5-3 | (MBMI1-2 + 9EGDMA):electrolyte* (%) = 5:95 MBMI1-2:9EGDMA = 1:2 BCHPC:(MBMI1-2 + 9EGDMA) = 1:10 | 1<br>2<br>3<br>4 | 271.5<br>268.5<br>261.7<br>259.3 | 235.9<br>262.5<br>259.1<br>257.9 | 86.9<br>97.8<br>99.0<br>99.5 | 13.1<br>2.2<br>1.0<br>0.5 |

Electrolyte: a composition of 1.1M $LiPF_6$ and EC/DEC/PC = 2:3:1.5

The results indicate that the cell comprising 5-3 composition (MBMI1-2 oligomer) provides the highest charge/discharge efficiency and the lowest irreversibility.

Example 6

Electrical Performance of Gel-Type Polymer Cell

After the aluminum foil cell (50×20×30 mm) was assembled, the polymer precursor was polymerized therein at 90° C. for 1 hr. The charge/discharge rate was 0.2 C. The results were shown as in Table 6.

TABLE 6

| No. | Composition ratios | Charge/discharge numbers | Charge capacitance (mAh) | Discharge Capacitance (mAh) | Charge/discharge efficiency | Irreversibility of charge/discharge (%) |
|---|---|---|---|---|---|---|
| 6-1 | MBMI1-2:10EGDMA = 1:2 EC/PC/PA = 3:2:2.5, 1.1M $LiPF_6$ 90° C., 1 hr | 1<br>2<br>3<br>4 | 289.1<br>293.2<br>287.4<br>285.5 | 258.9<br>285.9<br>284.1<br>282.8 | 89.6<br>97.5<br>98.9<br>99.1 | 10.4<br>2.5<br>1.1<br>0.9 |
| 6-2 | MBMI1-2:10EGDMA = 1:2 EC/PC/PA = 3:2:2.5, 1.1M $LiPF_6$ 70° C., 3 hr | 1<br>2<br>3<br>4 | 282.6<br>290.0<br>284.7<br>283.0 | 252.6<br>284.9<br>283.4<br>282.1 | 89.4<br>98.2<br>99.5<br>99.7 | 10.6<br>1.8<br>0.5<br>0.3 |
| 6-3 | MBMI1-2:10EGDMA = 1:2 EC/PC/PA = 3:2:2.5, 1.1M $LiPF_6$ 90° C., 3 hr | 1<br>2<br>3<br>4 | 282.3<br>285.6<br>284.4<br>285.1 | 255.8<br>281.3<br>283.0<br>283.9 | 90.6<br>98.5<br>99.5<br>99.6 | 9.4<br>1.5<br>0.5<br>0.4 |

The results indicate that the cells comprising 6-1~6-3 compositions (MBMI1-2 oligomer) provides the highest charge/discharge efficiency and the lowest irreversibility. The capacitance of the gel-type polymer cell is similar to that of the liquid lithium cell, about 290 mAh.

Example 7

Leakage Test of Cell

After the aluminum foil cell (50×20×30 mm) was assembled, the polymer precursor was polymerized therein at 90° C. for 1 hr or 70° C. for 3 hr. Next, the cell end was cut and pressed by a 30 kg weight for 2 min to observe leakage. The results were shown as in Table 7.

TABLE 7

| No. | Composition ratio | Cell No. | Leakage |
|---|---|---|---|
| 7-1 | EC/PC/PA = 3:2:2.5, 1.1M $LiPF_6$ Liquid lithium cell | 7-1-1<br>7-1-2<br>7-1-3<br>7-1-4 | Yes<br>Yes<br>Yes<br>Yes |

TABLE 7-continued

| No. | Composition ratio | Cell No. | Leakage |
|---|---|---|---|
| 7-2 | MBMI1-2:10EGDMA = 1:2 EC/PC/PA = 3:2:2.5, 1.1M $LiPF_6$ 90° C., 1 hr Gel-type polymer lithium cell | 7-2-1<br>7-2-2<br>7-2-3<br>7-2-4 | No<br>No<br>No<br>No |
| 7-3 | MBMI1-2:10EGDMA = 1:2 EC/PC/PA = 3:2:2.5, | 7-3-1<br>7-3-2<br>7-3-3 | No<br>No<br>No |

TABLE 7-continued

| No. | Composition ratio | Cell No. | Leakage |
|---|---|---|---|
| | 1.1M LiPF$_6$ 70° C., 3 hr Gel-type polymer lithium cell | 7-3-4 | No |
| 7-4 | MBMI1-2:10EGDMA = 1:2 EC/PC/PA = 3:2:2.5, 1.1M LiPF$_6$ 90° C., 3 hr Gel-type polymer lithium cell | 7-4-1 7-4-2 7-4-3 7-4-4 | No No No No |

Example 8

After the aluminum foil cell (50×20×30 mm) was assembled, the polymer precursor was polymerized therein at 90° C. for 1 hr. The charge/discharge rate was 0.2 C. Next, the cell end was cut and pressed by a 30 kg weight for 2 min to observe leakage. The results were shown as in Table 8.

TABLE 8

| No. | Composition ratio | Charge capacitance (mAh) | Discharge Capacitance (mAh) | Charge/discharge efficiency (%) | Irreversibility of charge/discharge (%) |
|---|---|---|---|---|---|
| 8-1 | MBMI1-2:10EGDA:PVDF-HFP = 0.292:0.583:0.125 | 316 | 289 | 91.5% | 8.5% |
| 8-2 | | 319 | 291 | 91.2% | 8.8% |
| 8-3 | | 317 | 288 | 90.9% | 9.1% |
| 8-4 | | 320 | 290 | 90.6% | 9.4% |
| 8-5 | | 321 | 292 | 91.0% | 9.0% |

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A gel polymer electrolyte precursor utilized in a rechargeable cell, comprising:

a bismaleimide monomer or bismaleimide oligomer, wherein the bismaleimide oligomer is prepared by reaction of barbituric acid and bismaleimide monomer;

a compound having formula (I):

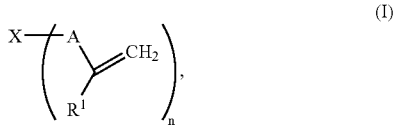

wherein X comprises oxygen, organic hydrocarbon compounds, organic hydrocarbonoxide compounds, oligomers or polymers; n is 2 or 3; A independently comprises

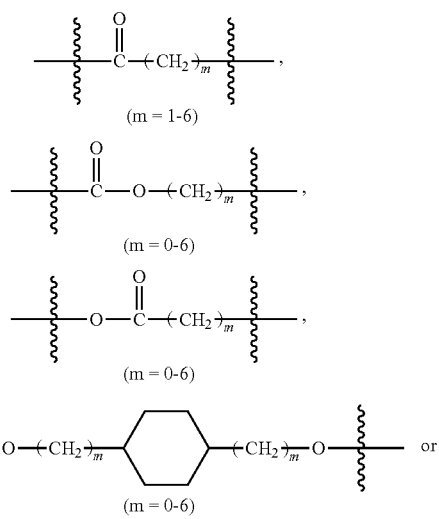

-continued

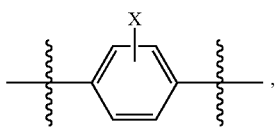

wherein x comprises hydrogen, cyano, nitro or halogen; and $R^1$ independently comprises hydrogen or C1-4 alkyl;

a non-aqueous metal salt electrolyte;

a non-protonic solvent; and a free radical initiator.

2. The gel polymer electrolyte precursor utilized in a rechargeable cell as claimed in claim 1, wherein the bismaleimide monomer or bismaleimide oligomer has a weight ratio of 1-50%, the compound having formula (I) has a weight ratio of 1-50%, the non-aqueous metal salt electrolyte has concentration of 0.5M-2M in the non-protonic solvent, the non-protonic solvent has a weight ratio of 2-90% and the free radical initiator has a weight ratio of 0.1-10% of the sum of the bismaleimide monomer or bismaleimide oligomer and the compound having formula (I).

3. The gel polymer electrolyte precursor utilized in a rechargeable cell as claimed in claim 1, wherein the bismaleimide monomer has formulae (II) and (III):

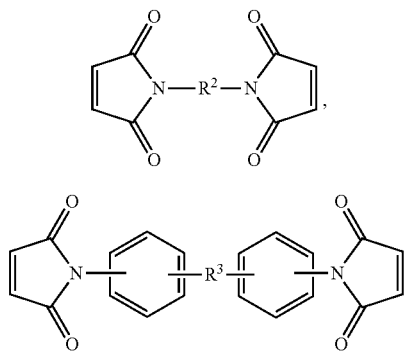

wherein R² comprises —RCH₂— (alkyl), —RNH₂R—, —C(O)CH₂—, —CH₂OCH₂—, —C(O)—, —O—, —O—O—, —S—, —S—S—, —S(O)—, —CH₂S(O)CH₂—, —(O)S(O)—, —C₆H₅—, —CH₂(C₆H₅)CH₂—, —CH₂(C₆H₅)(O)—, phenylene, diphenylene, substituted phenylene or substituted diphenylene, R³ comprises —RCH—, —C(O)—, —C(CH₃)₂—, —O—, —O—O—, —S—, —S—S—, —(O)S(O)— or —S(O)—, and R independently comprises hydrogen or C1-4 alkyl.

4. The gel polymer electrolyte precursor utilized in a rechargeable cell as claimed in claim 1, wherein the bismaleimide monomer is selected from the group consisting of N,N'-bismaleimide-4,4'-diphenylmethane, [1,1'-(methylenedi-4,1-phenylene)bismaleimide], [N,N'-(1,1'-biphenyl-4,4'-diyl)bismaleimide], [N,N'-(4-methyl-1,3-phenylene)bismaleimide], [1,1'-(3,3'dimethyl-1,1'-biphenyl-4,4'-diyl)bismaleimide], N,N'-ethylenedimaleimide, [N,N'-(1,2-phenylene)dimaleimide], [N,N'-(1,3-phenylene)dimaleimide], N,N'-thiodimaleimide, N,N'-dithiodimaleimide, N,N'-ketonedimaleimide, N,N'-methylene-bis-maleinimide, bis-maleinimidomethyl-ether, [1,2-bis-(maleimido)-1,2-ethandiol], N,N'-4,4'-diphenylether-bis-maleimide and [4,4'-bis(maleimido)-diphenylsulfone].

5. The gel polymer electrolyte precursor utilized in a rechargeable cell as claimed in claim 1, wherein the barbituric acid has formula (IV):

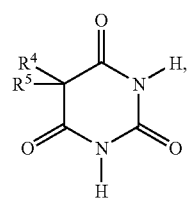

wherein R⁴ and R⁵ are the same or different and comprise H, CH₃, C₂H₅, C₆H₅, CH(CH₃)₂, CH₂CH(CH₃)₂, CH₂CH₂CH(CH₃)₂ or

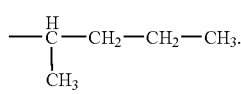

6. The gel polymer electrolyte precursor utilized in a rechargeable cell as claimed in claim 1, wherein X comprises C1-20 alkyl, C4-20 cycloalkyl, C2-20 unsaturated hydrocarbon, C6-20 aromatic hydrocarbon or combinations thereof, wherein

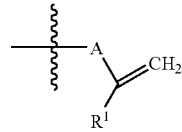

is substituted for hydrogen of X.

7. The gel polymer electrolyte precursor utilized in a rechargeable cell as claimed in claim 1, wherein X comprises C1-20 monoalcohol, C1-20 polyalcohol, C1-20 aldehyde, C₂₋₂₀ ether, C₂₋₂₀ ketone, C₂₋₂₀ ester, C₂₋₂₀ heterocyclic aromatic hydrocarbon or combinations thereof, wherein

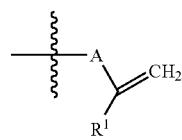

is substituted for hydrogen of X.

8. The gel polymer electrolyte precursor utilized in a rechargeable cell as claimed in claim 1, wherein X comprises —C$_i$H$_{2i}$—O—C$_i$H$_{2i}$—, —O—C$_j$H$_{2j}$—O—, phenyl, alkyl, —C$_j$H$_{2j}$—S(═O)—C$_j$H$_{2j}$— or —C$_j$H$_{2j}$—(O═)S(═O)—C$_j$H$_{2j}$—, with a molecular weight less than 300, wherein i is 0-6, j is 1-6, and

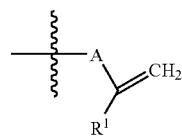

is substituted for hydrogen of X.

9. The gel polymer electrolyte precursor utilized in a rechargeable cell as claimed in claim 1, wherein X has formula of

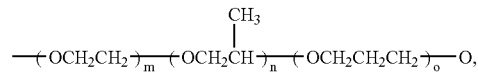

wherein m and n are integers exceeding 1.

10. The gel polymer electrolyte precursor utilized in a rechargeable cell as claimed in claim 1, wherein X comprises polyethylene glycol or polypropylene glycol, with a molecular weight exceeding 300, wherein

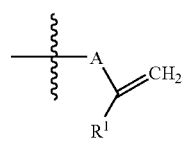

is substituted for hydrogen of X.

11. The gel polymer electrolyte precursor utilized in a rechargeable cell as claimed in claim 1, wherein the compound having formula (I) comprises polyethylene glycol dimethacrylate, bis[[4-[(vinyloxy)methyl]cyclohexyl]methyl]terephthalate, triallyl trimellitate, tetra(ethylene glycol) diacrylate, triethylene glycol dimethacrylate, bis[4-(vinyloxy)butyl]succinate or bis[4-(vinyloxy)butyl]isophthalate.

12. The gel polymer electrolyte precursor utilized in a rechargeable cell as claimed in claim 1, further comprising a thickening agent comprising poly(vinylidenefluoride) (PVdF), poly(vinylidene fluoride-co-hexafluoropylene) (PVdF-HFP), poly(vinylidene carbonates) (PVdC), poly acrylonitrile (PAN), poly(vinyl chloride) (PVCA), poly(vinyl sulfone) (PVS), poly(p-phenylene terethalamide) (PPTA), poly(vinyl pyrrolidone) (PVP), polyethylene glycol diacrylate, polyethylene glycol diacrylate or polyvinylene carbonate.

13. The gel polymer electrolyte precursor utilized in a rechargeable cell as claimed in claim 1, wherein the non-aqueous metal salt electrolyte is selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$ and $LiCF_3SO_3$.

14. The gel polymer electrolyte precursor utilized in a rechargeable cell as claimed in claim 1, wherein the non-protonic solvent comprises a first solvent with higher dielectric constant and higher viscosity and a second solvent with lower dielectric constant and lower viscosity.

15. The gel polymer electrolyte precursor utilized in a rechargeable cell as claimed in claim 14, wherein the first solvent is selected from the group consisting of ethylene carbonate (EC), propylene carbonate (PC), butylene carbonate, dipropyl carbonate, acid anhydride, N-methylpyrrolidone, N-methyl acetamide, N-methyl formamide, dimethyl formamide, γ-butyrolactone, acetonitrile, dimethyl sulfoxide and dimethyl sulfite.

16. The gel polymer electrolyte precursor utilized in a rechargeable cell as claimed in claim 14, wherein the second solvent is selected from the group consisting of 1,2-diethoxyethane, 1,2-dimethoxyethane, 1,2-dibutoxyethane, tetrahydrofuran, 2-methyl tetrahydrofuran, propylene oxide, methyl acetate, ethyl acetate, methyl butyrate, ethyl butyrate, methyl propionate, ethyl propionate, dimethyl carbonate (DMC), diethyl carbonate (DEC), ethyl methyl carbonate (EMC) and propyl acetate (PA).

17. The gel polymer electrolyte precursor utilized in a rechargeable cell as claimed in claim 1, wherein the free radical initiator is selected from the group consisting of ketone peroxide, peroxy ketal, hydroperoxide, dialkyl peroxide, diacyl peroxide, peroxy ester and azo compound.

18. The gel polymer electrolyte precursor utilized in a rechargeable cell as claimed in claim 1, wherein the free radical initiator comprises 2,2-azo-bis-isobutyronitrile (AIBN), phenyl-azo-triphenylmethane, t-butyl peroxide (TBP), cumyl peroxide, acetyl peroxide, benzoyl peroxide (BPO), lauroyl peroxide, t-butyl hydroperoxide, [Bis(4-tert-butylcyclohexyl) peroxydicarbonate] (BCHPC) or t-butyl perbenzoate.

19. The gel polymer electrolyte precursor utilized in a rechargeable cell as claimed in claim 1, further comprising a passive-film type additive.

20. The gel polymer electrolyte precursor utilized in a rechargeable cell as claimed in claim 19, wherein the passive-film type additive comprises vinylene carbonate, sulfites, sulfates, phosphonate or derivatives thereof.

21. An alkali metal rechargeable cell, comprising:
a negative electrode capable of electrochemical insertion and removal from alkali metal;
a positive electrode comprising an electrode active substance capable of electrochemical insertion and removal from alkali metal; and
a gel polymer electrolyte prepared by heating polymerization/cross-linking of the gel polymer electrolyte precursor as claimed in claim 1.

22. The gel polymer electrolyte precursor utilized in a rechargeable cell as claimed in claim 1, wherein A is

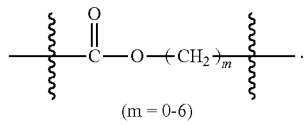

(m = 0-6)

23. The gel polymer electrolyte precursor utilized in a rechargeable cell as claimed in claim 1, wherein A is

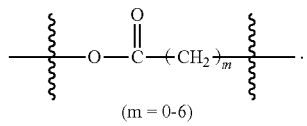

(m = 0-6)

24. The gel polymer electrolyte precursor utilized in a rechargeable cell as claimed in claim 1, wherein A is

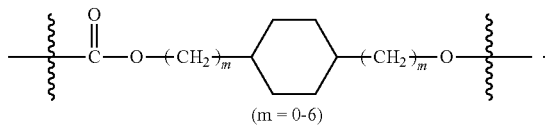

(m = 0-6)

25. The gel polymer electrolyte precursor utilized in a rechargeable cell as claimed in claim 1, wherein A is

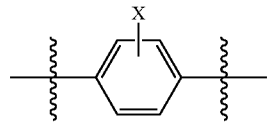

wherein x comprises hydrogen, cyano, nitro or halogen.

* * * * *